W. F. FOX.
PROJECTING MACHINE.
APPLICATION FILED DEC. 17, 1913.
1,166,120.
Patented Dec. 28, 1915.
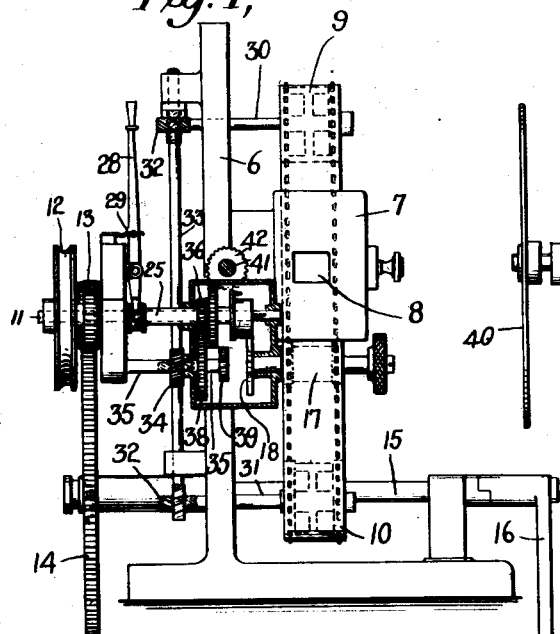
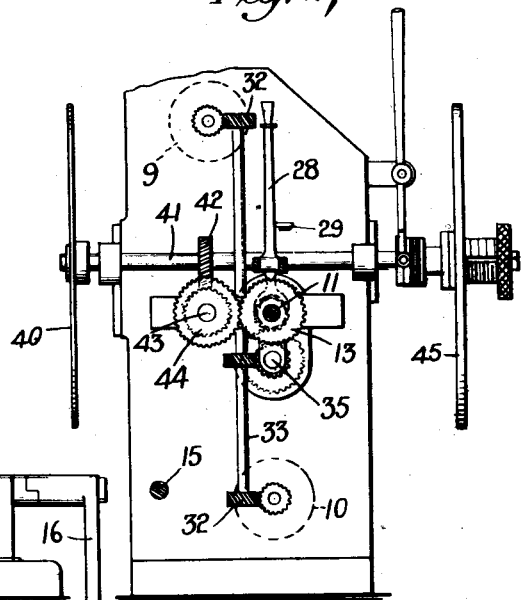
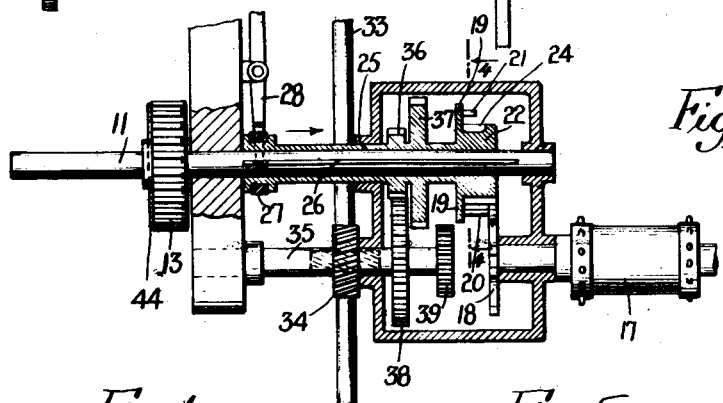
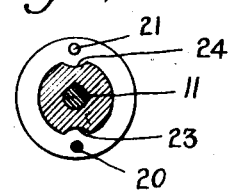
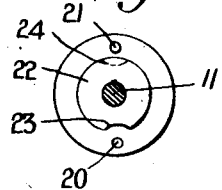
WITNESSES
INVENTOR
ATTORNEYS

UNITED STATES PATENT OFFICE.

WILLIAM F. FOX, OF NEW YORK, N. Y., ASSIGNOR OF TWO-THIRDS TO KINEMACOLOR COMPANY OF AMERICA, OF NEW YORK, N. Y., A CORPORATION OF DELAWARE.

PROJECTING-MACHINE.

1,166,120.  Specification of Letters Patent.  Patented Dec. 28, 1915.

Application filed December 17, 1913. Serial No. 807,169.

*To all whom it may concern:*

Be it known that I, WILLIAM FRANCIS FOX, a subject of the King of Great Britain, residing in the borough of Manhattan, city and State of New York, have invented certain new and useful Improvements in Projecting-Machines, of which the following is a specification.

This invention relates to moving picture apparatus and more particularly to machines employed in projecting pictures of objects in motion upon a screen.

In order to produce moving pictures in natural colors, it has been common heretofore to provide moving picture films on which the pictures are arranged in pairs, one for projection through a green screen or filter and the other for projection through a red screen or filter. If desired a third color could also be employed and the pictures arranged in groups of three instead of two. For projecting the pictures of such a film, it is necessary that the film be moved at comparatively high speed, substantially double the speed at which movement of the film takes place when the pictures are not reproduced in their natural colors in which latter case each picture appears but once upon the film. When operating in accordance with the two-color process displaying the pictures alternately through screens of green and red colors, a speed of thirty-two movements of the film per second is common, whereas when projecting pictures in black and white, a speed of sixteen movements of the film per second is sufficient.

It is often desired to display the pictures on a two-color process film and also the pictures on a black and white film with the same projecting machine. This has been done heretofore by employing a projecting machine constructed for use with a two-color process film and operating the machine at substantially half of its normal speed. This, however, has produced very poor results, particularly in that the flicker is unusually pronounced.

The present invention is directed to the provision of a projecting machine which may be used for projecting color films on which the pictures are duplicated for projection through screens of different colors and which may also be used for projecting a black and white film. In accordance with the invention, the projecting machine is so constructed as to permit of changing the speed at which the film is fed intermittently by the film-feeding mechanism and also the speed at which the devices for feeding out and taking up the film are operated without changing the speed of operation of the rotary shutter. In the preferred embodiment of the invention, the gearing by which the power-shaft drives the intermittent film-feeding mechanism, the rolls for feeding out and taking up the film and the shutter includes a movable element which in one position causes the power-shaft to operate the intermittent film-feeding mechanism at one speed, as thirty-two times per second, and to operate the feeding and take-up rolls for the film at a corresponding speed, while in the other position, it causes the power-shaft, when operating at the same speed, to actuate the intermittent film-feeding mechanism at a different speed, as sixteen times per second, and the film-feeding and take-up rolls at a speed corresponding to the changed speed of the intermittent film-feeding mechanism, the shutter being rotated at the same speed in both cases, namely, that which is suitably used when the film is fed at the greater of the two speeds referred to.

I have illustrated in the accompanying drawings a mechanism which may be employed in practising the invention, the illustration being partially diagrammatic.

In these drawings Figure 1 is a front view of a projecting machine broken away and sectioned in part. Fig. 2 is a side view of the machine partly in section showing the gearing of the operating mechanism, Fig. 3 is a vertical section of a portion of the mechanism on an enlarged scale, Fig. 4 is a detail sectional view on line 4—4 of Fig. 3 and Fig. 5 is an end view of the member shown in Fig. 4.

Referring to these drawings, a projecting machine is shown in Figs. 1 and 2 having a standard 6 on which is mounted the frame 7 for the picture, this frame having an opening 8 therein through which the picture is displayed. The film containing the pictures in single line sequence is fed through frame 7 intermittently so that the pictures are brought to rest successively in line with the opening 8. The film is fed out and taken up by rolls 9 and 10, one above and the other below the frame 7. These rolls 9 and 10 are operated continuously while the film-feeding mechanism is operated intermittently and the film is fed through the machine in such a manner that loops are formed between the roll 9 and frame 7 and between the frame 7 and roll 10.

The power shaft for operating the mechanism of the machine is shown at 11. It may be driven in any suitable manner; in the present instance it is shown as having a pulley 12 applied to its end. The power shaft carries a gear 13 which meshes with the gear 14 on a shaft 15 to which crank 16 is applied, so that when it is desired to do so the machine may be operated manually. The power shaft is arranged to actuate intermittently a roll 17 having teeth thereon which effects the intermittent feeding movement of the film. This intermittent movement of the roll 17 is effected by a Geneva gear comprising a cross 18 mounted on the shaft of the roller 17. This cross 18 is actuated by a rotary member 19 whose construction is shown in detail in Figs. 3, 4 and 5. From these figures it will be seen that the member 19 has two pins 20 and 21 thereon projecting laterally parallel to the axis. One of these pins is much shorter than the other. Between the pins is a body 22 shaped to coöperate with the cross 18 and form a lock to prevent movement of the cross except when it is engaged by one of the two pins. The body 22 is shown in end view in Fig. 5. It is generally cylindrical in shape but adjacent to the pin 20 it is cut away as shown at 23, this cutaway portion 23 extending the full length of the body 22. Adjacent to the pin 21, which is the shorter pin, the body 22 is also cut away as shown at 24, but this cutaway portion 24 does not extend the full length of the body 22. Preferably the dimension of the body 22 in the direction of its axis is slightly more than three times the thickness of the cross 18 and the cutaway portion 24 is slightly greater in length than twice the thickness of the cross 18. With these parts 18 and 19 in the relation shown in Fig. 3, rotation of the member 19 will cause the pin 20 to engage the cross 18 so that the roll 17 will be turned a quarter revolution for each revolution of the member 19. Between successive actuations of cross 18 the latter will be locked against movement by the body 22 which, when in the position shown, presents to the cross 18 a cylindrical locking surface which is unbroken except at the cutaway portion 23, which is necessary to permit movement of cross 18 when actuated by pin 20. The member 19 may, however, be moved in the direction of its axis to the right in Fig. 3 to such a position that when it is rotated both pins 20 and 21 will engage the cross 18 so that roll 17 will be given two step movements of a quarter revolution each during each revolution of member 19. Between successive actuations of the cross 18 thus, the latter will be locked against movement by the body 22 which, in this position of the member 19, presents to the cross 18 a cylindrical surface which is broken at the points 23 and 24 necessary to permit movement of the cross by the pins 20 and 21. The extension of the cutaway portion 24 a substantial distance laterally from the end of pin 21 is necessary in order to permit axial movement of the member 19 without discontinuing its revolution so that the cross 18 will not be locked by the cylindrical portion beyond the end of the groove 24 at the same time when it is engaged by the end of pin 21.

The member 19 is driven by the power shaft 11 but is axially movable upon the power shaft. For this purpose it is affixed to a sleeve 25 which is splined upon the shaft 11 as is shown at 26. The sleeve 25 is moved on shaft 11 by a collar 27 located in a circumferential groove of the sleeve and engaged by the end of an operating lever 28 pivotally mounted upon the frame of the machine and preferably provided with a retaining device 29.

The rolls 9 and 10 for feeding and taking up the film are mounted upon shafts 30 and 31 respectively which are connected by gears 32 to a vertical shaft 33. This shaft 33 is connected by gears 34 to a shaft 35 parallel to the power shaft 11. The shaft 35 is driven by the power shaft 11 but provision is made for changing the speed at which the power shaft drives the shaft 35 when changing the position of the member 19 so as to change the speed at which the step by step movement of the film takes place. On the sleeve 25 are two gears 36 and 37 which are adapted to mesh with two gears 38 and 39 respectively on the shaft 35. When the member 19 is in the positions shown in Figs. 1 and 3 the gear 36 meshes with the gear 38 and the rolls 9 and 10 are driven continuously through this gearing and the shafts 35, 33, 30 and 31 at a speed corresponding to the intermittent feeding movement of the film effected by the member 19 when in that position. But movement of the member 19 to the other position for doubling the speed of the intermittent movement of the film carries the gear 36 out of mesh with the gear 38 and the gear 37 into mesh with the gear 39 and the sizes of these gears are such that this movement of the sleeve 35 causes the speed of the rolls 9 and 10 to be doubled.

The machine is provided with a rotary shutter 40, as is usual in projecting machines, interposing an opaque screen in line with the opening 8 when the film is being moved. This shutter 40 is rotated by the power shaft 11 but its speed of rotation relative to the power shaft is not altered when changing the speed of the film-moving mechanism relatively to the power shaft.

The shaft 41 of the shutter is connected by gears 42 to a horizontal shaft 43 on the end of which is a gear 44 meshing with the gear 13 on the power shaft. It will thus be seen that the power shaft is directly connected to the shaft of the shutter 40 so as to rotate the shutter and that the connection is such that it is unaffected by movement of the parts controlled by the lever 28. By means of this mechanism, the intermittent film-moving mechanism and the feeding and take-up devices may be driven by the power shaft at one speed or at double that speed, the power shaft being driven at the same speed in both cases, and this change from one speed of the film-moving mechanism to another may be readily made by movement of the handle 28. In fact, the change effected by movement of the handle 28 can be made when the mechanism is in operation. By reason of the provision of this mechanism, the machine may be employed to exhibit pictures upon a two-color process film requiring exhibition at the rate of 32 pictures per second or it may be employed for exhibiting pictures upon a black and white film which should be displayed at the rate of about 16 pictures per second. The change from one rate of operation to another can be effected quickly and readily so that there is practically no delay in adapting the machine for exhibition of a film of one character after using it with a film of another. The same shutter mechanism may be used with both classes of films for this is arranged to be driven by the power shaft independently of the change-speed mechanism. When employing the machine to reproduce pictures in natural colors, a color screen 45 would be applied to shaft 41 in addition to the shutter thereon but this screen or filter would be removed before reproducing the black and white pictures.

The shutter is arranged as stated to rotate at a speed which is suitable for the performance of its function when the film is being moved at the greater rate referred to, as when pictures in a two-color process are being exhibited. Consequently when the film is moved at the lesser rate referred to, which rate constitutes an integral fraction of the first-mentioned rate, the blade or blades of the shutter break up the light period of each picture projection into a plurality of parts, the results as regards the absence of flicker being good. It should be noted that the speed at which the film is intermittently fed forward during its periods of movement is the same, for both the operations with one pin and with both pins of the film-feeding mechanism, the difference between the two movements being that the periods of movement occur twice as often in the one case as in the other. Accordingly, if the speed of the shutter relative to that of the power-shaft were caused to change when the rate of actuation of the film-moving and take-up devices is changed, the speed of the shutter relative to that of the film during the intermittent forward movements of the latter would be varied, causing poor results in the projection. This difficulty is overcome by my invention.

Having described my invention, what I claim as new therein and desire to secure by Letters Patent of the United States is:

1. A moving picture machine having a power-shaft extending into the same, an intermittent film feeding member, a gear driving said member, a rotary shutter, connections for rotating the same from the power-shaft at a definite rate with respect to that of the power-shaft, and shiftable means rotated from the power-shaft and adapted, in either of two positions, to rotate said gear intermittently, said shiftable means being arranged, when in one position, to rotate said gear at a given rate, with which the rate of said shutter corresponds, and, when in another position, to rotate said gear with the same speed of movement, but with periods between movements occupying times which are multiples of the times between movements when said shiftable means is in its first position, the power-shaft rotating at the same speed in both instances, substantially as set forth.

2. A moving picture machine having a power-shaft, a film-feeding member, a Geneva gear driving said member, a rotary member driven by the power-shaft and having two pins thereon, and means for causing either one or both of said pins to actuate said gear, substantially as set forth.

3. A moving picture machine having a power-shaft, a feeder for the film, a Geneva gear driving the feeder, a member driven by the power-shaft having two pins thereon and movable to cause either one or both of said pins to actuate said gear, feeding and take-up devices for the film driven by the power-shaft, and means actuated by movement of said member for changing the speed at which the power-shaft drives the feeding and take-up devices, substantially as set forth.

This specification signed and witnessed this 13th day of December, 1913.

WILLIAM F. FOX.

Witnesses:
S. O. EDMONDS,
I. McINTOSH.